April 19, 1949.　P. F. ROSSMANN ET AL　2,467,946
PHOTOELECTRIC CAMERA EXPOSURE CONTROL
APPARATUS HAVING PLANETARY GEARS
AND CONCENTRIC CAMERA LENS
Filed Feb. 16, 1946　3 Sheets-Sheet 3
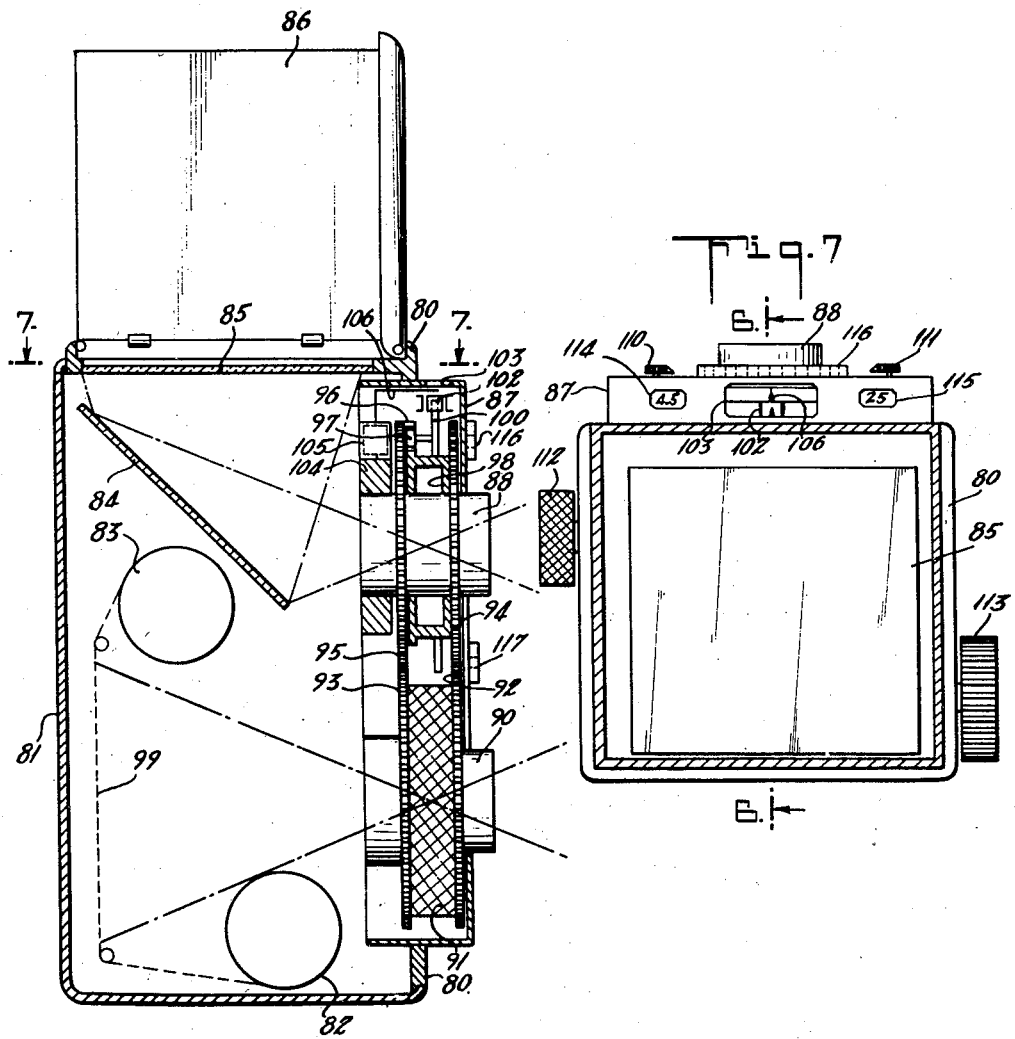
INVENTOR
PETER F. ROSSMANN
KARL RATH
BY Patented Apr. 19, 1949

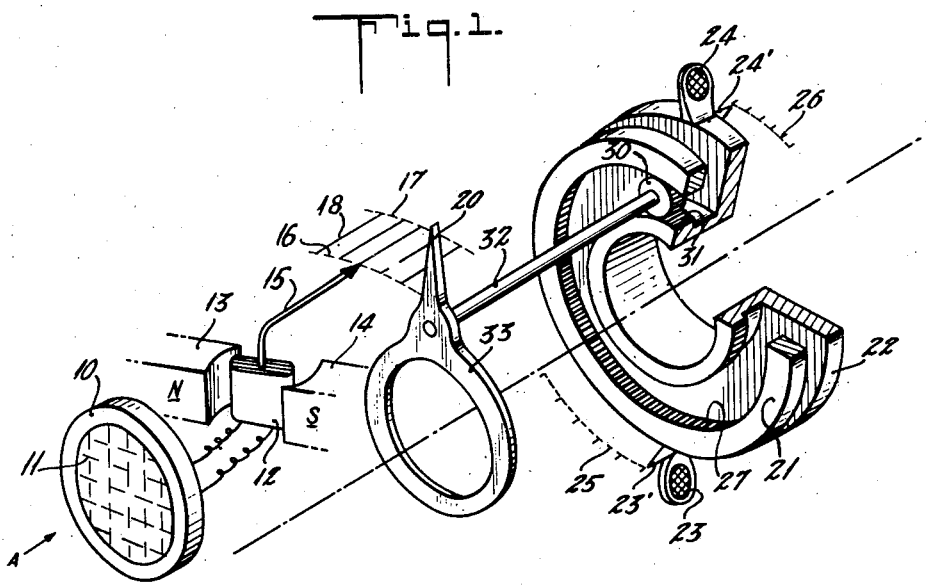
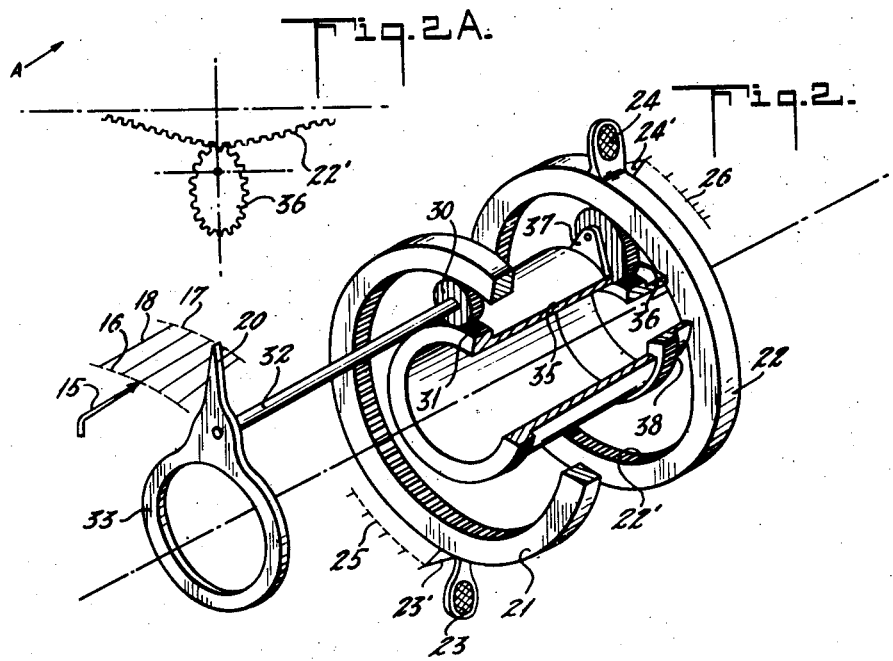

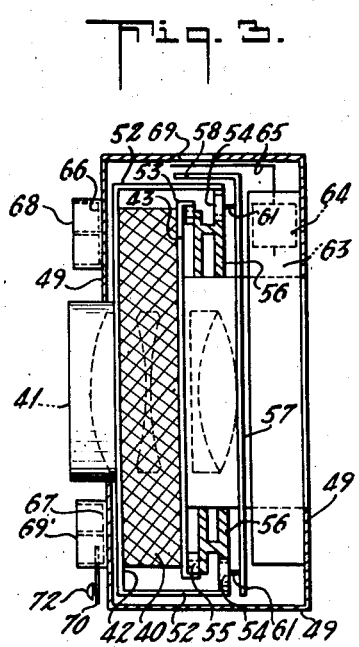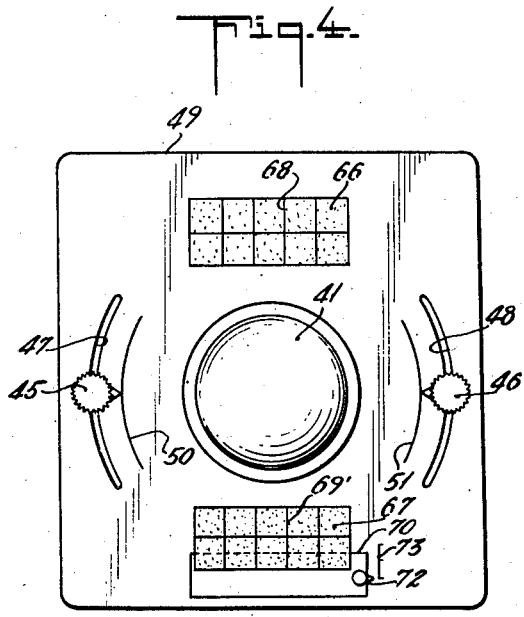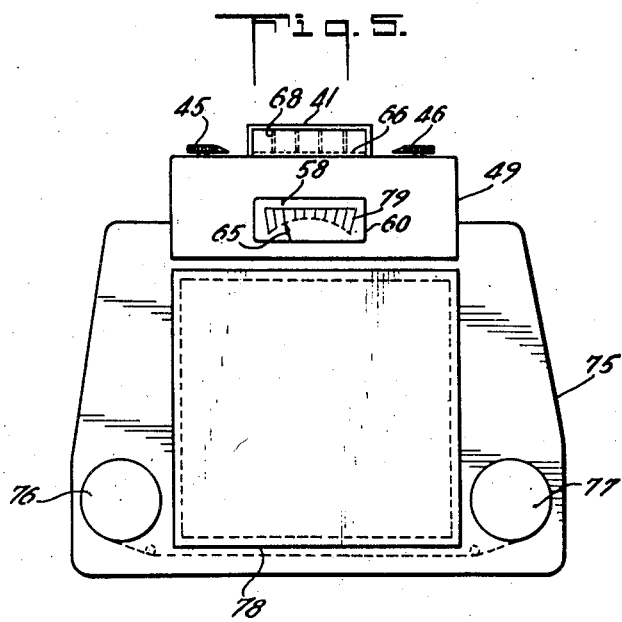

2,467,946

UNITED STATES PATENT OFFICE 2,467,946

PHOTOELECTRIC CAMERA EXPOSURE CONTROL APPARATUS HAVING PLANETARY GEARS AND CONCENTRIC CAMERA LENS

Peter F. Rossmann, Summit, N. J., and
Karl Rath, New York, N. Y.

Application February 16, 1946, Serial No. 648,078

6 Claims. (Cl. 95—10)

1

The present invention relates to automatic exposure control for photographic cameras, more particularly to devices of this type comprising a photoelectric cell producing an electric current in accordance with the brightness of a scene or subject to be photographed and means for controlling the adjustment of the exposure organs of a camera in dependence upon said current to insure a correctly exposed photograph.

In the standard photographic camera, exposure, i. e., the amount of light energy acting upon the sensitive emulsion of the film or plate in the focal plane of the camera, is substantially determined by the product of the relative lens aperture or stop adjustment determining the amount of light passing through the lens, on the one hand, and by the shutter speed or exposure time during which the light acts upon the emulsion to produce a latent image suitable for development into a visible image, on the other hand. Other secondary exposure controlling factors such as emulsion sensitivity, also known as film or plate speed, filter factors, etc., remain the same or constant over sensitivity, also known as film or plate speed, filter is used by the photographer.

The choice of the lens aperture and exposure time is by no means arbitrary, but is governed in most cases by special considerations of a pictorial and other character which makes it desirable, if not imperative, in automatic or semi-automatic exposure control, to enable a choice or pre-selection of either adjustment to suit existing conditions and picture-taking requirements and to then control the other adjustment in dependence upon the response of the photoelectric cell to insure a correct exposure under the existing scene or subject brightness conditions. In other words, it is desirable to provide an exposure control system which will enable a selective distribution of a given scene or subject brightness upon the aperture and exposure time adjustments of the camera in such a manner as to result in a correct exposure under any varying existing conditions or for any pictorial requirements or final results to be obtained.

Thus, for example, it may be desired or necessary to insure a certain depth of focus determined in a known manner by the relative lens opening or aperture adjustment. In this case, upon setting of the required aperture, the control device should be such as to enable the adjustment of the coordinated exposure time to a proper value in accordance with an existing subject or scene brightness. Alternatively, there are many cases when a definite exposure time or shutter speed

2 are required, such as for preventing blurring of the picture due to camera movement or in case of fast-moving objects or for any other reasons. In all these cases, the control should be such as to enable a pre-selection of the required shutter speed and a subsequent setting or control of the aperture to its correct value depending upon the response current of the photoelectric device, i. e., in turn, the existing scene or subject brightness.

An object of the invention, therefore, is to provide a novel exposure control system of the above general character which is capable of mutual selective adjustment by enabling either of the main exposure controls, i. e., lens aperture and exposure time, to be pre-selected or set as desired, whereupon the other control may be adjusted or moved to its proper position in accordance with the response of a photoelectric device within a given range of scene or subject brightness conditions.

A more specific object of the invention is to provide an exposure control system of the type referred to, utilizing a photovoltaic cell and an electrical indicator directly and permanently connected thereto, substantially without requiring any controls or adjustments in the electrical circuit of said cell, whereby to insure both maximum efficiency of the light indication as well as constant operating and adjusting characteristics of the exposure control.

In known exposure control systems of this type utilizing variable resistors in series with the photoelectric cell and indicator and coupled with the exposure controls of the camera, variations of the electrical characteristics of the cell due to changes in the outer load result in considerable errors if not complete inoperativeness, especially if more than one resistor is provided to consider a plurality of exposure control factors.

A further object of the invention is the provision of a single exposure control pointer coupled with both the aperture and shutter speed controls of a camera and adapted for selectively distributing the deflection of a light pointer operated by a photoelectric cell upon the aperture and shutter speed adjustments.

Another object is to provide a device of this type which is both simple mechanically and capable of structural combination with existing shutter and diaphragm controls without substantially increasing the size and bulk of the camera.

The above and further objects and novel aspects of the invention will become more apparent from the following detailed description taken in reference to the accompanying drawings forming part of this specification, and wherein:

Figure 1 is a schematic isometric view illustrating the basic construction of an exposure control device according to the invention;

Figure 2 being a view similar to Figure 1 shows a modified exposure control device according to the invention;

Figure 2A is a partial view illustrating the shape of the compensating gears embodied in Figure 2;

Figure 3 is a cross-section through a standard central type photographic shutter embodying an exposure control device according to the invention;

Figure 4 is a front view of Figure 3;

Figure 5 is a schematic view of a camera embodying a shutter and exposure control device as shown in Figures 3 and 4;

Figure 6 is a cross-section of a twin-lens reflex camera embodying an exposure control device according to the invention; and Figure 7 is a sectional view taken on the line 7—7, Figure 6.

Like reference characters identify like parts throughout the different views of the drawings.

Referring more particularly to Figure 1 of the drawings, there is shown at 10 a photovoltaic cell which may be of the well known selenium-on-iron or copper-cupreous oxide type suitably mounted upon a camera and provided with acceptance angle limiting means such as a cellular baffle or grille 11 to restrict its view angle to substantially correspond or coincide with the picture angle of the camera lens or, in other words, to be responsive to light only which emanates from the scene or object being photographed in the operative position of the camera, as indicated by the arrows A in the drawing.

The electric current generated by the cell 10, which is proportional to the scene or subject brightness, serves to energize a milliammeter type electrical indicator comprising in a known manner a pivotally mounted moving coil 12 directly and permanently connected to the cell 10 and a permanent magnet of which only the two north and south pole pieces 13 and 14 are shown in the drawing for the sake of simplicity of illustration. Moving coil 12 carries a pointer or needle 15 bent at a right angle as shown and arranged to cooperate with a first scale 16 associated with a further scale 17 through a series of guide or lead lines 18 applied to a suitable dial or plate. Item 20 represents an exposure pointer cooperating with scale 17 and forming a part of the special selective or differential adjusting mechanism of the invention coupling the same with the aperture and shutter speed controls shown at 21 and 22, respectively. The latter are provided with adjusting members 23 and 24 which carry pointers 23', 24' cooperating with the corresponding adjusting scales 25 and 26 which indicate the numerical adjustments of the aperture and shutter speeds, respectively.

In Figure 1 it has been assumed that both aperture and shutter speed scales are of a like character, that is, having scale divisions which follow equal, such as linear, laws in passing from one to the next scale graduation. In case of the shutter speed, this is inherently the case with most standard shutter constructions. In the case of the aperture, the usual iris or other control device may be so designed, such as by the use of suitably shaped leaves or by means of a compensating device, as to obtain a constant or linear scale division as shown in the drawing, in place of the usual exponential scale of the standard shutter.

In the example shown, control 21 has the form of a ring concentric with the lens axis and provided with internal gear teeth 27 to serve as a first side gear meshing with a planetary gear 30 which, in turn, engages the external gear teeth of a second inner sun or side gear 31 also concentric to the lens axis and being of lesser diameter than gear 21. Sun gear 31 forms a part of or is rigidly coupled with the second control 22. Planet gear 30 is furthermore connected through a rod 32 parallel to the lens axis to a ring or differential carrier 33 also concentric to and rotatable about the lens axis and provided with a radial extension forming the exposure pointer 20.

In an arrangement of the type afore-described, the planet gear 30 moves along a circle around the lens axis to an extent determined substantially by the sum or difference of the rotation or angular adjusting movements of the controls 21 and 22. The translatory movement of the planet gear 30 being concentric to the lens axis is transferred to the exposure pointer 20 for comparison or adjustment to coincidence with the photoelectric or light pointer 15. In other words, the movement of the exposure pointer 20 will be equal to the sum of the angular displacement ratio of controls 21 and 22 if the latter are moved in the same direction, and to the difference of said displacement ratio if controls 21 and 22 are adjusted in opposite directions, depending on the choice or pre-selection of one of the controls in the manner pointed out hereinabove.

Accordingly, therefore, each of the adjustments of the controls 21 and 22 which are suitably coupled with the lens aperture or shutter speed control organs of a camera is transformed into a corresponding displacement of a single exposure pointer through the differential coupling mechanism 21—22—30 in such a manner as to enable a selective distribution of the light pointer deflection upon both the aperture and shutter adjustments by simply causing the pointers 15 and 20 to coincide or to be properly correlated through the lead or guide lines 18.

As is understood, the lead lines 18 may be dispensed with and the pointers 15 and 20 arranged to overlap in the adjusting position if the adjusting movements of the controls 21 and 22 or the character of the scales 25 and 26 are alike, and follow a similar law as the deflection of the light pointer 15 as a function of the light intensity or scene brightness. The ordinary photographic scales 25 and 26 are of a logarithmic character, i. e., a change from and to the next scale division corresponds to a doubling or halving of the preceding exposure. This would mean that the light meter scale 16 should be of a like nature, that is, equal scale divisions should represent a doubling or halving of the amount of light passed through the lens. Since normally the current produced by a photovoltaic device is directly proportional to the light intensity, such a non-linear or logarithmic indicator may be obtained in a known manner by properly shaping the pole pieces 13 and 14 to reduce the torque on the moving coils as the deflection increases, or by providing a fixed resistance of several thousand ohms connected in series with the cell and indicator. This resistance results in a change of the normally linear response characteristic of the light indicator into a substantially logarithmic response curve similar to the logarithmic exposure scales 25 and 26. In this case, therefore, where the meter deflection follows a similar law as the exposure controls 21 and 22, the guide lines 18 may be omitted and the pointers 15 and 20 arranged to directly overlap when brought to coincidence in the final exposure adjustment.

If, however, the relative laws of the light indicator and exposure controls differ from each other, guide or lead lines shown at 18 may be provided to afford a proper correlation and accuracy of the exposure control in a simple manner, as is well understood.

There is thus provided by the invention a simple exposure control device which may be easily mounted around the lens mount of a camera without obstructing the light passage through the lens and which, without affecting the function and characteristics of the light meter, and which will enable a selective distribution of the scene brightness indicated by the meter upon both the aperture and shutter speed controls in a most simple and efficient manner.

An advantage of the special concentric differential gear system of the invention is due to the fact that the exposure pointer movement is different for equal angular displacements of the controls 21 and 22, since the gear teeth 31 are necessarily of a lesser number than the gear teeth 27. This fact may be advantageously utilized to compensate for the different length of the scales 25 and 26 usually found in the standard photographic shutter in such a manner that equal changes in exposure by moving either of the controls 21 or 22 will result in an equal displacement of the exposure pointer 20. In the arrangement shown in the drawing, the control 22 will cause a greater angular movement of the planet gear 30 and in turn of the pointer 20 and, accordingly, for the ordinary shutter construction, scale 26 represents the shutter speed scale which has a greater length than the aperture scale 25.

According to a modification of the invention as shown in Figure 2, the difference in the scale characteristics 25 and 26 is compensated by a special compensating gear arrangement interposed between the control 22 and the inner or sun gear 31 of the differential mechanism. For this purpose, control 22 also takes the form of a ring similar to control 21 and provided with internal gear teeth 22' meshing with compensating gear 36 suitably journalled in a bracket 37 of the cylindrical extension 35 of the sun gear 31. If desired, a cooperating inner fixed gear 38 may be provided for proper guidance of the compensating gear 36.

The pitch perimeters of gears 22' and 36 are different from a circle and are so shaped, as shown in Figure 2A, as to result in a proper change in the transmission ratios from point to point to convert the non-linear displacement according to the aperture scale 26 into substantially equal angular displacements of the sun gear 31 and in turn of the exposure pointer 20.

In Figure 2 it has been assumed that control 21 varies the exposure time and control 22 varies the aperture and that, furthermore, the latter has a lesser angular spread or adjusting range than the former, as indicated by the scales 25 and 26, respectively. The relative length of the adjusting ranges or scales depends both upon the special shutter construction and the total range of apertures and exposure times to be covered by the automotive control.

Alternatively, for a given type of shutter, the adjusting ranges of controls 21 and 22 may be given any desired values, such as those shown in Figure 2, by the provision of suitable transmission or coupling devices between said controls and the corresponding exposure control organs of the camera. Thus, in case of gear transmissions as provided in Figures 6 and 7 and described in greater detail hereafter, a proper choice of the transmission ratios will result in a desired total displacement or adjusting range for the controls 21 and 22 to suit any existing conditions and requirements, as is understood.

Moreover, it is also possible to convert the linear adjustment of the exposure time control into a non-linear adjustment equal to that of the aperture control by means of a similar compensating gear of the type shown. In this case the displacement of the exposure pointer 20 will again be equal as a result of equal adjustments, in terms of exposure, of the controls 21 and 22. The light pointer will then necessarily have to follow a log-log law as a function of the scene brightness unless lead lines 18 are provided to afford proper correlation with the exposure pointer in the final exposure adjustment.

Referring to Figures 3 and 4, there is shown an exposure control device of the type according to Figure 2 structurally combined with a standard central type photographic shutter and lens mount to provide a complete compact unit suitable for embodiment in any type of camera structure. Item 40 represents a shutter and lens mount of standard type including a lens 41 and being provided with front and rear ring-shaped adjusting members 42 and 43 for controlling the lens aperture and shutter speed, respectively. Members 42 and 43 may be adjusted or set in any suitable manner such as by means of adjusting knobs 45 and 46 attached to the outer ends of suitable studs or rods having their inner ends secured to the control members 42 and 43 and passing through suitable arcuate guide slots in the disk 42 and slots 47 and 48 in the front wall of a protective casing 49 enclosing the shutter and exposure control device. The adjusting knobs 45 and 46 are shown provided with pointers cooperating with the aperture and shutter speed scales 50 and 51 which correspond to the scales 25 and 26 of Figures 1 and 2, respectively.

The control rings 42 and 43 are both provided with outer cylindrical extensions 52 and 53 terminating in internal gears which cooperate with the planetary gear 54 and compensating gear 55, respectively. An inner sun gear member 56 rotatable about the lens mount cooperates with the gears 54 and 55 in substantially the same manner as shown more clearly in Figure 2. Item 57 is a ring-shaped member carrying the exposure pointer 58 which is bent at a right angle so as to be visible in a viewing opening or window 59 in a top wall of casing 49. Member 57 and with it the exposure pointer 58 are connected to the planet gear 54 through a rod 61. If desired, two or more planet gears 54 may be provided, connected to and driving the member 57, as shown in the drawing. In this manner, the entire differential mechanism coupled between the camera controls and the exposure pointer 58 may be mounted directly upon the rear of the shutter 40 without in any way interfering with or obstructing the optical or light passage through the lens.

In a similar manner, the electrical indicator is mounted concentrically to the lens mount directly behind the differential gear devices and comprises a circular permanent magnet 63, a moving coil schematically indicated at 64 and a needle or pointer 65 bent at a right angle and cooperating with the exposure pointer in the viewing opening or window 60 in the manner shown in the drawing and readily understood from the foregoing.

The photovoltaic cell may be advantageously mounted upon the front wall of the casing 44 and is electrically connected directly to the moving coil 64 through insulating wires or leads in a manner readily understood. In the example shown in the drawing, there are provided two photovoltaic cells 66 and 67 equipped with suitable light baffles 68 and 69 and being mounted one above and one below the lens 41. Both cells are connected in parallel and across the indicator moving coil to increase the sensitivity and to enable the use of a smaller and less bulky meter construction.

In order to consider varying film speeds or other exposure controlling factors, any one of the known means may be employed for this purpose, such as the variation of the sensitivity of the light indicator. There is shown for this purpose in the drawing an adjustable shutter 70 arranged to cover variable areas of the cell 69. Shutter 70 is provided with an adjusting knob 72 having an index cooperating with a scale 73 which represents the different film speeds or any other exposure controlling factor.

The combined lens, shutter and exposure control device as shown in Figures 3 and 4 forms a complete self-contained unit which may be embodied in any type of camera structure such as shown by way of example in Figure 5 representing schematically a single-lens reflex camera and comprising a body 75, film supply and take-up spools 76 and 77, and a collapsible focussing hood 78. Other details like the movable mirror, etc., are well known and have been omitted from the drawing for the sake of simplicity of illustration. The shutter and iris control casing 49 is shown mounted in the front wall of the camera, the same reference numerals being employed as used in Figures 3 and 4. The light pointer 65 and exposure pointer 58 visible in the viewing slot 60 are furthermore shown to be connected through guide or lead lines 79 serving for proper correlation of the exposure pointer and light pointer movements in the manner set forth hereinabove.

Referring to Figures 6 and 7, there is shown another modification of an exposure control device according to the invention embodied in a twin-lens reflex camera of known construction. The camera shown comprises in a known manner a box-like casing 80 having a removable back 81, supply and take-up film spools 82 and 83, a reflector or mirror 84, a ground glass viewing screen 85, and a collapsible focussing hood 86, all of standard design and well known in the art. Item 87 is an extensible casing mounted in the front wall of the casing 80 and carrying the finder and picture-taking lenses 88 and 90, respectively, of equal focal length which in this manner are synchronized with each other so as to produce the same focussed image on both the film 99 and ground glass 85 of the camera.

Item 91 is a central shutter mounted around the picture-taking lens 90 and having front and rear exposure control gear rings or disks 92 and 93 meshing with further gears 94 and 95 of the differential drive mounted concentrically with the axis of the finder lens 88. Gear 95 has a cylindrical extension 96 provided with internal gear teeth meshing with the planet gear 97 which furthermore engages a sun gear forming part of the cylindrical rotating member 98 secured to the other control gear 94. Planet gear 97 drives a rotating ring 100 which has a radial extension frictionally engaging a sliding index member 102 arranged to move between suitable guides and visible within the viewing slot 103 in the top wall of the extensible casing 87. The circular magnet 104 of the indicator is also mounted around the finder lens and has a moving coil 105 carrying the needle 106 which is bent at a right angle so as to sweep over and cooperate with the index member 102 which carries a suitable index mark, as is more clearly seen in Figure 7.

The adjusting knobs 110 and 111 for the aperture and exposure time controls may be similar to those shown in Figure 4. Item 112 represents the focussing control for moving the casing 87 back and forth in parallel to the lens axis and 113 indicates the film-winding knob for advancing the film from the supply to the take-up spool in a manner well known. In order to indicate the numerical adjusting values without having to turn or tilt the camera, additional viewing windows 114 and 115 are provided in the top of the casing 87 exposing further scale members which are suitably coupled with the controls 92 and 93, respectively. A pair of photovoltaic cells 116 and 117 are shown mounted upon the front wall of the extensible casing 87 and connected for energizing the indicator in substantially the same manner as described hereinabove.

In order to compensate for the different scale characters of the aperture and exposure time controls, the corresponding pair of the cooperating gears 92, 94 and 93, 95 are suitably shaped such as in the manner shown in Figure 2A so as to obtain equal displacements of the index member 102 as a result of an angular rotation of either of the shutter controls from one to the next scale graduation. Not only may the gears 92 and 94 or 93 and 95 be suitably shaped to compensate for the unequal adjusting law of the aperture control, but, as pointed out, the choice of suitable transmission ratios between gears 92 and 94 or 93 and 95 will result in any final total range or displacement of the differential coupling elements to effect an equal displacement of the exposure pointer 102 in terms of equal exposure changes effected by the adjusting either of members 110 and 111, respectively. Other details of construction and operation will be readily understood and are evident from the foregoing.

In operation, the photographer, after pre-setting one of the exposure controls, say the shutter speed knob 111, to a desired value, adjusts the aperture control knob 110 to a point where the pointers 102 and 106 coincide, while holding the knob 111 in its pre-set position. As a result, the lens aperture will be automatically set to its proper value for securing a correctly exposed picture. Vice versa, pre-setting of a desired aperture by means of knob 110 and subsequent control of knob 111 to cause coincidence of the pointers 102 and 106, while holding knob 110 in the pre-set position, will result in the proper adjustment of the exposure time.

While there have been shown and described a few desirable embodiments of the invention, it is understood that this disclosure is for the purpose of illustration and that various changes in shape, proportion and arrangement of parts, as well as the substitution of equivalent elements for those herein shown and described may be made without departing from the spirit and scope of the invention, as described in the appended claims. The specification and drawings are accordingly to be regarded in an illustrative rather than a limiting sense.

We claim:

1. The combination with a twin-lens reflex camera including a picture taking lens, a finder lens adjacent thereto, shutter means having ring-shaped shutter speed and lens aperture control gears coaxial with said taking lens and a built-in photoelectric light meter having a deflectable pointer, of means for selectively distributing the response of said meter upon the shutter speed and aperture adjustments to secure correctly exposed photographs under varying light conditions and for a given emulsion speed, comprising a pair of ring-shaped side gears coaxial with said finder lens and each meshing with one of said control gears, a ring-shaped carrier arranged for rotation coaxially with said side gears, said side gears being provided with lateral extensions formed, respectively, with internal and external spur gear teeth of different pitch diameters and being substantially parallel to the gear axis, at least one planet gear rotatively mounted upon said carrier and meshing with both said internal and external gear teeth and means for correlating the rotation of said carrier with the deflection of said pointer.

2. In an arrangement as claimed in claim 1, wherein said last mentioned means is comprised of index means associated with said carrier and arranged to cooperate with said pointer.

3. The combination with a twin-lens reflex camera including a picture taking lens, a finder lens adjacent thereto, shutter means having shutter speed and lens aperture control gears co-axial with said taking lens and a built-in photoelectric light meter having a deflectable pointer, of means for selectively distributing the response of said meter upon the shutter speed and lens aperture adjustments to secure correctly exposed photographs under varying light conditions and for a given emulsion speed, comprising a first ring-shaped side gear coaxial with said finder lens and meshing with the shutter speed control gear, a second ring-shaped side gear also coaxial with said finder lens and meshing with the lens aperture control gear, said second side gear and aperture control gear being provided with cooperating non-circular gear sections to effect equal angular movements of said second side gear for equal adjustments of said aperture control gear in terms of exposure, a ring-shaped carrier arranged for rotation coaxially with said side gears, said side gears having lateral extensions provided with, respectively, internal and external gear teeth of different pitch diameter, at least one planet gear rotatably mounted upon said carrier and meshing with both said external and internal gear teeth, and means for correlating the rotation of said carrier with the deflection of said pointer.

4. In an arrangement as claimed in claim 3, wherein said last mentioned means is comprised of index means rigidly connected to said carrier and arranged to cooperate with said pointer.

5. The combination with a twin-lens reflex camera having a picture-taking lens, a finder-lens, shutter means having ring-shaped shutter speed and lens aperture control gears co-axial with said taking lens and a built-in photoelectric light meter having a deflectable pointer, of means for selectively distributing the response of said meter upon the shutter speed and lens aperture controls to secure correctly exposed photographs under varying light conditions comprising a pair of ring-shaped side gears co-axial with said finder lens and each meshing with one of said control gears, a ring-shaped carrier arranged for rotation co-axially with said side gears, said side gears having lateral extensions formed, respectively, with internal and external gear teeth of different pitch diameter, at least one planet gear rotatably mounted upon said carrier and meshing with both said internal and external gear teeth, means including an index element for correlating the rotation of said carrier with the deflection of said pointer, and scale means arranged for simultaneous viewing with said index element to indicate the adjusting positions of both said control gears.

6. The combination with a twin-lens reflex camera having a picture-taking lens, a finder lens, shutter means having shutter speed and lens aperture control gears co-axial with said taking lens and a built-in photoelectric light meter having a deflectable pointer, of means for selectively distributing the response of said meter upon the shutter speed and lens aperture controls to secure correctly exposed photographs under varying light conditions comprising a first ring-shaped side gear co-axial with said finder lens and meshing with the shutter speed control gear, a second ring-shaped side gear also co-axial with said finder lens and meshing with the lens aperture control gear, said second side gear and aperture control gear being provided with co-operating non-circular gear sections to effect equal angular movements of said second side gear for equal adjustments of said aperture control gear in terms of exposure, a ring-shaped carrier arranged for rotation co-axially with said side gears, said side gears having lateral extensions provided with, respectively, internal and external gear teeth of different pitch diameter, at least one planet gear rotatably mounted upon said carrier and meshing with both said external and internal gear teeth, means including an index element for correlating the rotation of said carrier with the deflection of said pointer, and scale means arranged for simultaneously viewing with said index element to indicate the adjusting positions of both said control gears.

PETER F. ROSSMANN.
KARL RATH.

REFERENCES CITED

The following references are of record in the file of this patent:

UNITED STATES PATENTS

| Number | Name | Date |
| --- | --- | --- |
| 2,194,031 | Riszdorfer | Mar. 19, 1940 |
| 2,194,152 | Riszdorfer | Mar. 19, 1941 |
| 2,305,294 | Kuppenbender | Dec. 15, 1942 |
| 2,341,393 | Simmon | Feb. 8, 1944 |
| 2,387,466 | Rath | Oct. 23, 1945 |

FOREIGN PATENTS

| Number | Country | Date |
| --- | --- | --- |
| 660,602 | Germany | May 30, 1938 |